United States Patent
Wu et al.

(10) Patent No.: US 6,353,744 B1
(45) Date of Patent: Mar. 5, 2002

(54) METHOD FOR POSITIONING WITH LOW GEOMETRICAL DILUTION OF POSITION (GDOP)

(75) Inventors: Shiquan Wu, Ottawa; Song Zhang, Kanata; Xixian Chen, Nepean, all of (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/374,103

(22) Filed: Aug. 16, 1999

(51) Int. Cl.[7] .................................................. H04Q 7/20
(52) U.S. Cl. ................... 455/456; 342/357.09; 342/450
(58) Field of Search ............................... 455/456, 457, 455/422, 575; 342/357.01, 357.02, 357.04, 357.06, 357.09, 450, 457, 458, 462, 463, 452

(56) References Cited

U.S. PATENT DOCUMENTS

| | | | |
|---|---|---|---|
| 5,652,592 A | * 7/1997 | Sanderford et al. | 342/462 |
| 6,006,097 A | * 12/1999 | Hornfeldt et al. | 455/456 |
| 6,009,091 A | * 12/1999 | Stewart et al. | 455/456 |
| 6,122,512 A | * 9/2000 | Bodin | 455/456 |
| 6,256,505 B1 | * 7/2001 | Kingdon et al. | 455/456 |

* cited by examiner

Primary Examiner—Nay Maung
Assistant Examiner—Quochien B. Vuong

(57) ABSTRACT

The invention is directed to positioning with low geometrical dilution of position (GDOP). Generally, the invention is a method for positioning including the steps of transmitting a asynchronous signal from a mobile to at least one base station; receiving the asynchronous signal at each base station; for each base station, determining a spherical line of position for the mobile using the received non-synchronous signal; and positioning the mobile using the spherical lines of position. The invention is a position location system which has the merits of both spherical and hyperbolic positioning systems while avoiding their drawbacks. The invention is less sensitive to GDOP and the mathematical model is easier to handle than the known hyperbolic system. The mathematical model embodied in the invention is equivalent to a convex quadratic probing subject to an ice-cream cone constraint. The invention also embodies an efficient algorithm for this optimization model. The invention is primarily directed to position location for E911, it can also applied to any other fields where position location is used, such as, but not limited to, radar positioning, satellite positioning and navigation systems.

8 Claims, 2 Drawing Sheets

METHOD FOR POSITIONING WITH LOW GEOMETRICAL DILUTION OF POSITION (GDOP)

FIELD OF THE INVENTION

The present invention relates generally to positioning and more particularly to a method and system for positioning with low geometrical dilution of position.

BACKGROUND OF THE INVENTION

Emergency 911 service is rapidly becoming essential in today's society. One of the compelling reasons for using the existing landline emergency 911 system is the ability to trace the caller's location. Using databases in the telephone network switches, the caller's location is determined and made available to the emergency services. In the event the caller is unable to inform the operator of their location, the ability to trace the call is invaluable.

The explosive growth of mobile phones, however, causes complications for emergency 911 services. While mobile users may call the 911 operator just as they would using a landline phone, there is no ability to trace the exact location of the mobile caller. The emergency 911 operator currently can only trace the mobile call to the base station closest to the mobile caller is using.

Mobile systems with the ability to locate mobile callers are known as enhanced 911 or E911 systems. One known approach to determine a mobile caller's location involves using an improved handset. The improved handset may incorporate a global positioning systems (GPS) receiver to determine the mobile caller's location and then transmit the location to the emergency 911 operator. Another improved handset may use signals from multiple base stations to determine the mobile caller's location. These handset improvements, however, involve improved handset circuitry that increases the cost of the handsets. Further, the extra circuitry requires extra battery power. Moreover, deployment of the improvement takes time since it depends on the users upgrading their handsets.

Another approach would not modify the handsets, thereby avoiding the problems started above. The so-called network approach involves modifying the base stations.

The network approach may use two known positioning systems: spherical and hyperbolic. The spherical system measures the time of arrival (TOA) from the mobile signal at base stations, which are at known locations. The hyperbolic system measures the time difference of arrival (TDOA) of the mobile signal between base stations.

Positioning By TOA (Spherical System)

If each receiver knows the transmission time of the mobile and the receivers are synchronized with each other, then they can measure the travel time (or TOA) of the mobile signal, and therefore the distance from the mobile to the receiver. For example, suppose there are more than 3 receivers and the measurement by each receiver has no error. Thus, around each receiver there is a circle with each receiver as the centre and the distance between the receiver and the mobile as radius. All the circles intersect at a unique point that is the position of the mobile. The circles are known as lines of position.

Assuming the spherical system receivers are synchronized, the TOA can be estimated accurately with moderate high signal to noise ratio. The solution of the spherical equations is no very sensitive to the TOA estimation errors. Spherical systems are widely used in positioning, but they cannot be used directly to position a mobile since the mobile is not synchronized with the base stations.

Positioning by TDOA (Hyperbolic system)

TDOA can be used to position the mobile. Suppose the signal sequence arrives at base stations at $(x_1,y_1)$, $(x_2,y_2)$, $(x_3,y_3)$ and TDOAs are measured are $\tau_{21}, \tau_{31}, \ldots$, and $v$ is the speed of light, then by the wave propagation property it follows that $$\sqrt{(x_3-x)^2+(y_3-y)^2}-\sqrt{(x_1-x)^2+(y_1-y)^2}=v\tau_{31} \qquad \text{Eqn. 1}$$

$$\sqrt{(x_2-x)^2+(y_2-y)^2}-\sqrt{(x_1-x)^2+(y_1-y)^2}=v\tau_{21} \qquad \text{Eqn. 2}$$

Therefore, Eqns. 1 and 2 define hyperbolic lines of position around the base stations if more than 3 base stations are involved in this positioning process. If there is no error for each TDOA measurement, all these hyperbolic curves will have a unique intersection, which is the position of the mobile.

Unlike the spherical system that measures TOA, the hyperbolic system measures TDOA and hence the mobile does not have to be synchronized with the base stations. Hyperbolic systems, however, are sensitive to Geometrical Dilution of Position (GDOP).

Geometrical Dilution of Position (GDOP)

There will always by the measurement errors in practice. Thus, the hyperbolas will deviate from the true curve to some extent depending on the measurement error distribution. The possible intersection of the hyperbolas might be anywhere in an area around the true location. This area is usually referred to GDOP. Thus, GDOP contributes to the overall location error. It can be shown that the GDOP is larger as the mobile location is far away from the central part of the triangular formed by base stations.

Therefore, clearly there is a need to reduce the GDOP in positioning systems.

SUMMARY OF THE INVENTION

The present invention is directed to positioning with low GDOP.

According to one aspect of the present invention, there is provided a method for positioning including the steps of: transmitting a asynchronous signal from a mobile to at least one base station; receiving the asynchronous signal at each base station; for each base station, determining a spherical line of position for the mobile using the received non-synchronous signal; and positioning the mobile using the spherical lines of position.

An advantage of the invention is less sensitivity to GDOP with a more convenient mathematical model.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The embodiments of the invention will now be described with reference to the accompanying drawings, in which.

Figure 1:
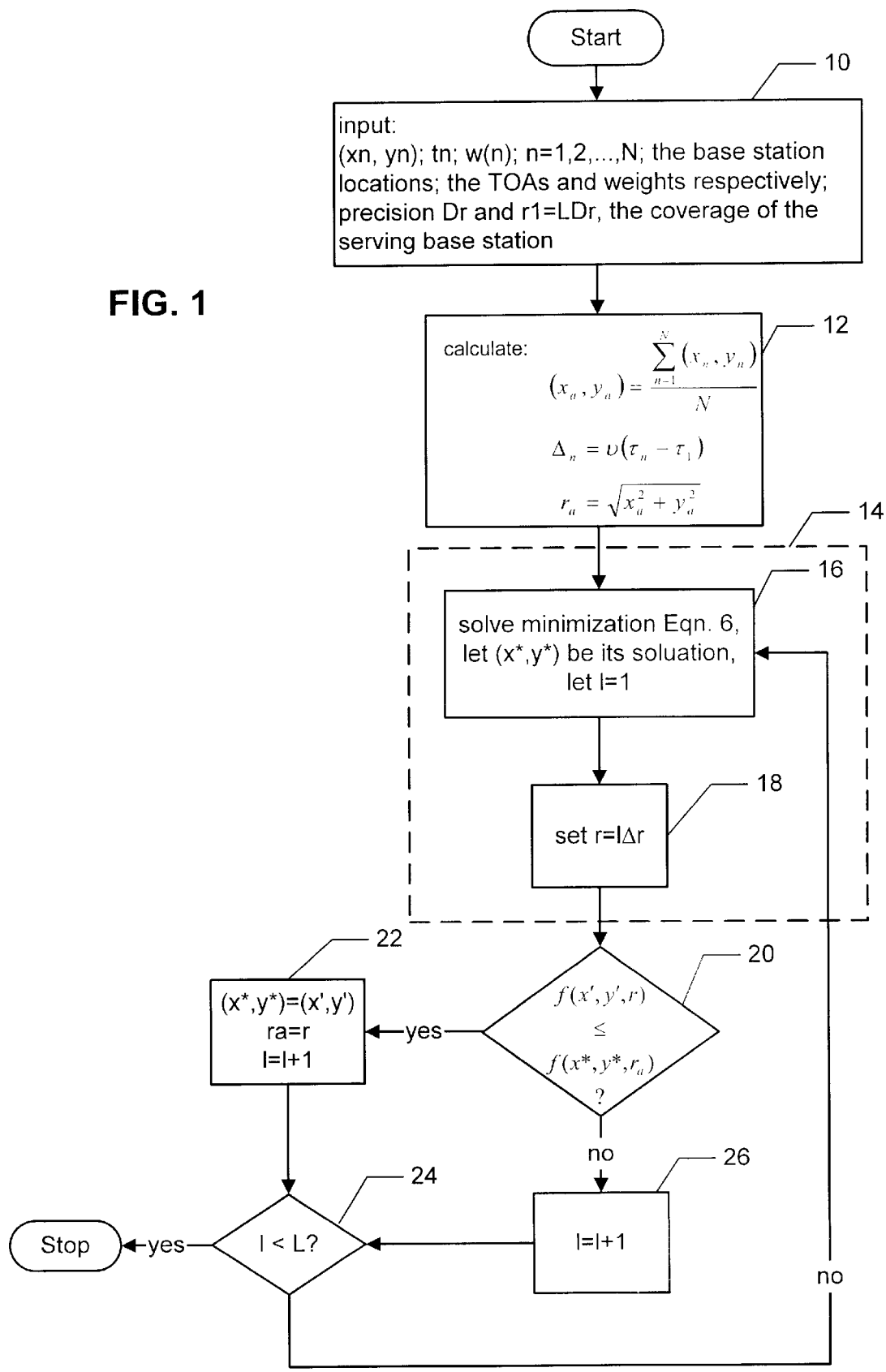
FIG. 1 is a flow chart of the Prone Algorithm used in an embodiment of the invention.
Figure 2:
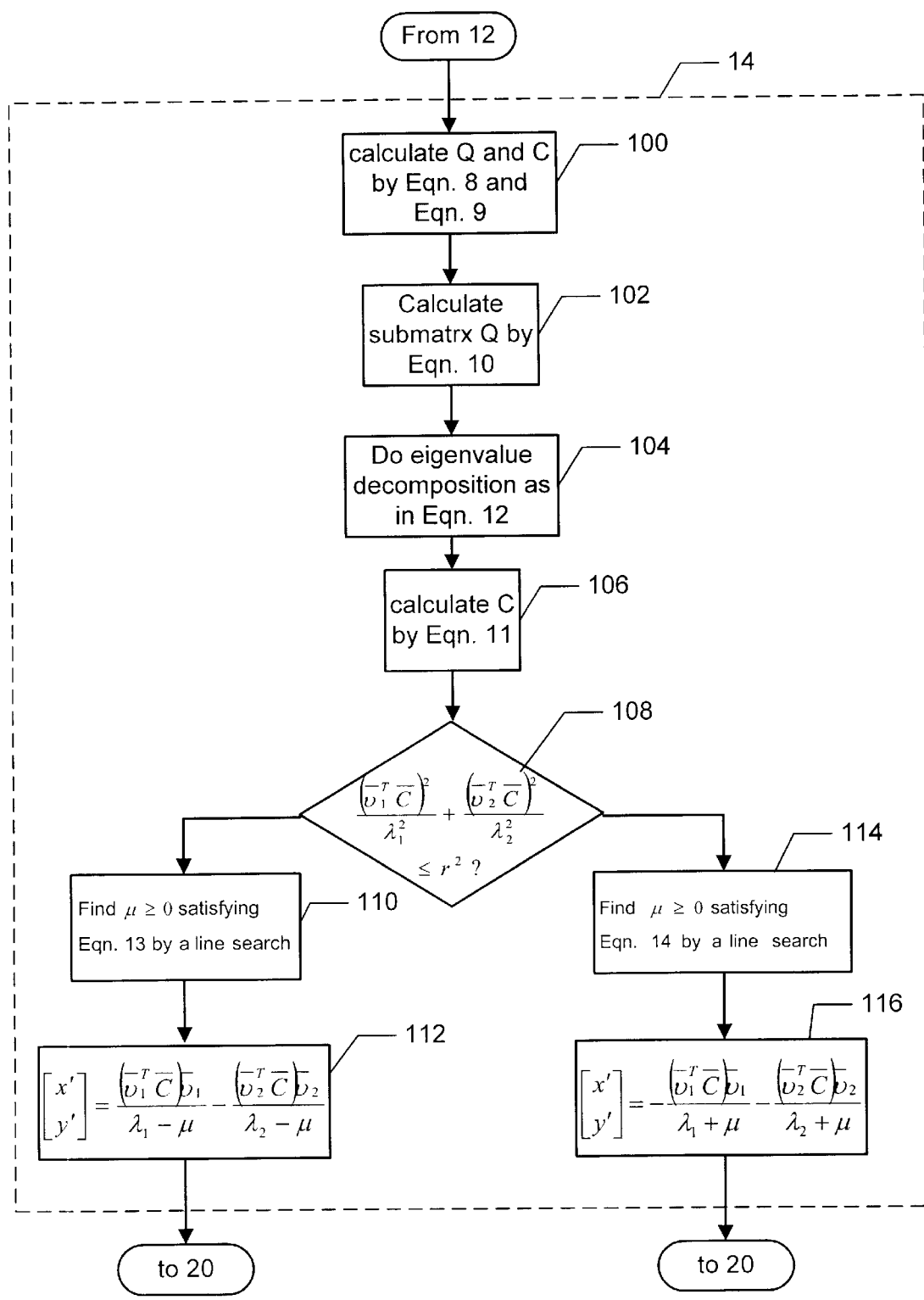
FIG. 2 is a flow chart of aspects of the Prone Algorithm used in an embodiment of the invention.

Similar references are used in different figures to denote similar components.

DETAILED DESCRIPTION OF THE INVENTION

The detailed description of the invention includes a general overview of the invention, and a description of the embodiments of the invention, including the presently preferred embodiment.

By way of overview, this invention is a position location system which has the merits of both spherical and hyperbolic positioning systems while avoiding their drawbacks. The invention is less sensitive to GDOP and the mathematical model is easier to handle than the known hyperbolic system. The mathematical model embodied in the invention is equivalent to a convex quadratic programming subject to an ice-cream cone constraint. The invention also embodies an efficient algorithm for this optimization model. The invention is primarily directed to position location for E911, it can also applied to any other fields where position location is used, such as, but not limited to, radar positioning, satellite positioning and navigation systems.

Therefore, generally speaking, the invention uses a reformulated hyperbolic system that is more like a spherical system. A least squares solution minimizes the sum of the error in the reformulated system.

Also, each base station is weighted based on the SNR of the received signal. Thus, the reformulated system can account for other practical issues in the system.

The reformulated system uses equations, that when plotted, define a cone. The cone is a function of variable r, thus for each r the equations define a circle. The variable r is the distance from mobile to serving base station. Although any base station van be picked, in practice the one being used by the mobile, that is highest SNR for min error is used.

The invention may also include a fast algorithm to solve the reformulated equations. The solution is on the surface of cone.

The algorithm, for a given r, solves a nonlinear minimization problem for x,y, then varies r and repeats. The minimum of all the solution sets is the result of the algorithm.

For a given r, the algorithm an almost results in an explicit answer. This results in a savings in computation power. As will be seen later, because Q bar is positive, then there are only two solutions from which to pick minimum, almost a closed form solution.

Thus, a method for positioning includes the steps of:

transmitting a asynchronous signal from a mobile to at least one base station.

receiving the asynchronous signal at each base station.

for each base station, determining a spherical line of position for the mobile using the received non-synchronous signal. Preferably, a time difference of arrival at each base station is used to determine the spherical lines of position.

positioning the mobile using the spherical lines of position.

Also preferably, the time difference of arrival at each base station is substantially equal to the difference between the asynchronous signal time of arrival at each base station and the asynchronous signal time of arrival at a serving base station.

A description of the presently preferred embodiment follows.

Positioning Model

Hyperbolic systems are more sensitive to GDOP than spherical systems. Hyperbolic systems were proposed originally for the acoustic sensors system under the sea and the purpose was to avoid the synchronization between receiver and those sensors. Thus, only those sensors needed to be synchronized so that they transmitted beacons at the same time. For the preferred E911 systems, the situation is just opposite. The base stations are passive receivers while mobile is the transmitter. An embodiment of the invention use circles rather than hyperbolae, but avoids synchronization between mobile and base stations.

As an example only, assume there are three base stations, A, B and C, and one mobile. Suppose the base stations have been synchronized and the mobile signal has arrived at base stations A, B and C at the time $\tau(A)$, $\tau(B)$ and $\tau(C)$ respectively and C is the serving base station. According to the wave propagation properly, the unknown mobile location (x,y) will satisfy the following equations:

$$(x-x_c)^2+(y-y_c)^2=r^2$$

$$(x-x_a)^2+(y-y_a)^2=(r+\Delta a)^2$$

$$(x-x_b)^2+(y-y_b)^2=(r+\Delta b)^2 \qquad \text{Eqn. 3}$$

where r is the distance from the mobile to the serving base station, $\Delta a=v(\tau(a)-\tau(c))$, $\Delta b=v(\tau(b)-\tau(c))$ and v is the velocity of the light. When the TOA estimation has error, the last two equations might become inequalities, it is ">" when TOA is underestimated and "<" when TOA is overestimated. But the first one is always equality since there is no error there. Note that now r is a variable rather than a constant, r needs to be optimized in order to estimate the mobile location.

Eqn. 3 can be solved and has a unique solution when TOA estimation has no error. Unfortunately, the real situation is that there is always estimation error and there are often more than 3 base stations being involved for the locating. In general, we will have an equation system looks like the following:

$$(x-x_1)^2+(y-y_1)^2=r^2$$

$$(x-x_2)^2+(y-y_2)^2=(r+\Delta_1)^2$$

$$(x-x_N)^2+(y-y_N)^2=(r+\Delta_N)^2 \qquad \text{Eqn. 4}$$

Here it is assumed that there are N base stations involved in location activity and $(x_N, y_N)$'s are the corresponding co-ordinates of these base stations. Note that the right hand sides of these equations are variables rather than fixed numbers. This enables an embodiment of the invention to use a spherical system without the need to know the transmission time of the mobile. Moreover, these equations are much easier than to solve hyperbolic equations. In summary, the invention has the advantages of both spherical positioning systems and hyperbolic positioning systems while reducing their disadvantages.

There are N equations (inequalities) and N variables. But only the first equation holds the exactly equality. Since all the equations are formed by circles, the error strip is only dependent on the TOA estimation error and is not sensitive to the geometric location of the mobile. So GDOP restriction is relaxed for this embodiment of the invention. Further, the TOA error distribution and the different contribution of each individual base station according to its hear-ability (SNR, C/I etc.) may be considered. These considerations are reflected by giving them different weights, say w(n) for the nth base station. Then, the positioning model to be optimized becomes $$\min f(x, y, r) = \sum_{n=2}^{N} w(n)|(x-x_n)^2 + (y-y_n)^2 - (r+\Delta_N)^2|^2 \quad \text{Eqn. 5}$$

$$\text{subject to } (x-x_1)^2 + (y-y_1)^2 = r^2, r \geq 0$$

Typically, w(n) can be set to any positive constant but it is preferably to equal to 1. Eqn. 5 is a convex quadratic and the constraint is an ice cream cone. Therefore, there exists highly efficient algorithm to solve this problem.

Algorithm for Optimizing the Positioning Model

The following is an algorithm called the Prone algorithm and is specially designed for the model defined by Eqn. 4. It is a kind of approximate algorithm and its precision and computation load can be pre-defined.

The Prone Algorithm

Input parameters to the algorithm are:

$r_1$, the radius of the serving base station coverage;

$(x_1, y_1)$, the co-ordinate of the serving base station;

N, the number of base stations involved;

$(x_n, y_n)$, n=2,3, . . . , N, the co-ordinates corresponding to the other base stations, the order of numbering is based on their hear-ability conditions such as C/I, SNR etc.;

w(n), n=2,3, . . . ,N, the assigned weights to each base station according to their C/I and SNR.

Let $$(x_a, y_a) = \frac{(x_1, y_1) + \sum_{n=2}^{N}(x_n, y_n)}{N}, r_a = \sqrt{(x_a - x_1)^2 + (y_a - y_1)^2}$$

and solve $$\min f(x, y, r_a) = \sum_{n=2}^{N} w(n)|(x-x_n)^2 + (y-y_n)^2 - (r_a+\Delta_t)^2|^2 \quad \text{Eqn. 6}$$

$$\text{subject to } (x-x_1)^2 + (y-y_1)^2 = r_a^2$$

Suppose $(x^*, y)$; be the solution and let $1^* = f(x^*, y^*, r^2)$. Clearly $1^*$ is less than $f(x_2, y_2, r_2)$.

for r=0:$\Delta r$:$r_1$;
   solve sub-optimization problem
   $\min(f(x,y,r)|(x-x_x)^2+y-y_y)^2=r^2$;
   Let (x',y') be its solution;
     if $1^*>f(x',y',r)$;

set $1^*=f(x',y'r)$; $(x^*,y^*)=(x',y')$;
     else $1^*=1^*$, $(x^*,y^*)=(x^*,y^*)$;
   end;
end Note that the final $(x^*, y^*)$ is the solution of the model with a resolution $\Delta r$. The key idea is the efficient subproblem solver, which is another aspect of the invention.

The Solution of Sub-optimization Problem

Without loss of generality, assume $(x_1, y_1)=(0,0)$, that is assume $(x_1, y_1)$ to be the co-ordinate system origin. Then the minimization problem becomes $$\min f(x, y, r) = \sum_{n=2}^{N} w(n)|(x-x_n)^2 + (y-y_n)^2 - (r+\Delta_N)^2|^2 \quad \text{Eqn. 7}$$

$$\text{subject to } x^2 + y^2 = r^2, r \geq 0$$

which can be simplified as $$\min f(x, y, r) = \frac{1}{2}[x \ y \ r]Q\begin{bmatrix}x\\y\\r\end{bmatrix} + C^T\begin{bmatrix}x\\y\\r\end{bmatrix} + \sum_{n=2}^{N} w(n)(x^2+y^2-\Delta_N^2)^2$$

$$\text{subject to } x^2 + y^2 = r^2, r \geq 0$$

where $$Q = \begin{bmatrix}q_{11} & q_{12} & q_{13}\\q_{12} & q_{22} & q_{23}\\q_{13} & q_{23} & q_{33}\end{bmatrix} = \sum_{n=2}^{N} w(n)\begin{bmatrix}x_n\\y_n\\\Delta_n\end{bmatrix}^T [x_n \ y_n \ \Delta_n] \quad \text{Eqn. 8}$$

$$C = \begin{bmatrix}C_1\\C_2\\C_3\end{bmatrix} = \frac{1}{2}\sum_{n=2}^{N}(x^2+y^2-\Delta_N^2)w(n)\begin{bmatrix}x_n\\y_n\\\Delta_n\end{bmatrix} \quad \text{Eqn. 9}$$

Thus, the optimization problem is actually a 3 dimensional convex minimization problem constrained on an ice-cream cone. There are many efficient algorithms existed for this type of problem. Interesting enough, for a fixed r, the above problem actually has an explicate solution which can be used in the Prone Algorithm. In fact, when r is fixed, the dimensional of the above minimization problem can be reduced to 2 as $$\min f(x, y, r) = \frac{1}{2}[x \ y]\overline{Q}\begin{bmatrix}x\\y\end{bmatrix} + \overline{C}'\begin{bmatrix}x\\y\end{bmatrix} + \frac{1}{2}q_{33}r^2 + C_3r + \sum_{n=2}^{N}w(n)(x^2+y^2-\Delta_N^2)^2$$

$$\text{subject to } x^2 + y^2 = r^2, r \geq 0$$

where

-continued $$\overline{Q} = \begin{bmatrix} q_{11} & q_{12} \\ q_{12} & q_{22} \end{bmatrix} \quad \text{Eqn. 10}$$

$$\overline{C} = \begin{bmatrix} C_1 \\ C_2 \end{bmatrix} + 2r \begin{bmatrix} q_{13} \\ q_{23} \end{bmatrix} \quad \text{Eqn. 11}$$

Since Q is related to the locations of base stations only and w(n) is positive, it is a positive definite matrix if at least 3 involved base stations are not co-linear. Suppose it has eigenvalue decomposition as $$\overline{Q} = \lambda_1 v_1 v_1^T + \lambda_2 v_2 v_2^T \quad \text{Eqn. 12}$$

where $0 < \lambda_1 \leq \lambda_2$ and $v_1$ and $v_2$ are the corresponding eigenvectors. Then there is two situations.

The first solution:

$\frac{(\overline{v}_1^T \overline{C})^2}{\lambda_1^2} + \frac{(\overline{v}_2^T \overline{C})^2}{\lambda_2^2} \leq r^2$, find $\mu 0$ such that -continued $$\frac{(\overline{v}_1^T \overline{C})^2}{(\lambda_1 - \mu)^2} + \frac{(\overline{v}_2^T \overline{C})^2}{(\lambda_2 - \mu)^2} = r^2 \text{ then} \quad \text{Eqn. 13}$$

$$\begin{bmatrix} x \\ y \end{bmatrix} = \frac{(\overline{v}_1^T \overline{C}) \overline{v}_1}{\lambda_1 - \mu} + \frac{(\overline{v}_2^T \overline{C}) \overline{v}_2}{\lambda_2 - \mu} \quad \text{Eqn. 14}$$

is the solution of the sub-minimization.

The second solution:

$\frac{(\overline{v}_1^T \overline{C})^2}{\lambda_1^2} + \frac{(\overline{v}_2^T \overline{C})^2}{\lambda_2^2} > r^2$, find $\mu 0$ such that $$\frac{(\overline{v}_1^T \overline{C})^2}{(\lambda_1 + \mu)^2} + \frac{(\overline{v}_2^T \overline{C})^2}{(\lambda_2 + \mu)^2} = r^2 \text{ then} \quad \text{Eqn. 15}$$

$$\begin{bmatrix} x \\ y \end{bmatrix} = \frac{(\overline{v}_1^T \overline{C}) \overline{v}_1}{\lambda_1 + \mu} - \frac{(\overline{v}_2^T \overline{C}) \overline{v}_2}{\lambda_2 + \mu} \quad \text{Eqn. 16}$$

is the solution. To find $\mu$, any line search algorithm, such as bi-section method, can be used.

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

What is claimed is:

1. A method for positioning comprising the steps of:

a. transmitting a asynchronous signal from a mobile to at least one base station;

b. receiving the asynchronous signal at each base station;

c. for each base station, determining a spherical line of position for the mobile using the received non-synchronous signal; and d. positioning the mobile using the spherical lines of position.

2. The method recited in claim 1 wherein step (c) uses a time difference of arrival at each base station to determine the spherical lines of position.

3. The method recited in claim 2 wherein the time difference of arrival at each base station is substantially equal to the difference between the asynchronous signal time of arrival at each base station and the asynchronous signal time of arrival at a serving base station.

4. The method recited in claim 3 wherein the spherical lines of position determined according to $$\begin{cases} (x - x_1)^2 + (y - y_1)^2 = r^2 \text{ for the serving base station} \\ (x - x_n)^2 + (y - y_n)^2 = (r + \Delta_n)^2 \text{ for } n = 2, \ldots, N \text{ non-serving base stations} \end{cases}$$

where (x,y) is the mobile position, $(x_1,y_1)$ is the location of the serving base station, $(x_n,y_n)$ are the locations of the non-serving base stations, N is the number of base stations, r is the distance of the mobile to the serving base station, and $\Delta_n$ is a distance based on the time difference of arrival.

5. The method according to claim 4 wherein the positioning the mobile step positions the mobile by minimizing the spherical lines of position.

6. The method recited in claim 3 wherein the spherical lines of position determined by minimizing $$\min f(x, y, r) = \sum_{n=2}^{N} w(n) |(x - x_n)^2 + (y - y_n)^2 - (r + \Delta_N)^2|^2$$

subject to $(x - x_1)^2 + (y - y_1)^2 = r^2, r \geq 0$ where (x,y) is the mobile position, $(x_1,y_1)$ is the location of the serving base station, $(x_n,y_n)$ are the locations of the non-serving base stations, N is the number of base stations, r is the distance of the mobile to the serving base station, w(n) is a predetermined for the nth base station and $\Delta_n$ is a distance based on the time difference of arrival.

7. The method according to claim 6 wherein the positioning the mobile step positions the mobile by minimizing the spherical lines of position.

8. The method recited in claim 7 wherein minimizing the spherical lines of position uses a Prone Algorithm.

* * * * *